United States Patent
Dosdall

(10) Patent No.: US 6,199,904 B1
(45) Date of Patent: Mar. 13, 2001

(54) DETECTING AUTOMOBILE SEAT OCCUPANT BY MICROWAVE ABSORPTION

(75) Inventor: James Michael Dosdall, Grosse Ile, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/537,149

(22) Filed: Mar. 29, 2000

(51) Int. Cl.[7] .................................................. B60R 21/02
(52) U.S. Cl. .............................................................. 280/735
(58) Field of Search .............................................. 280/735

(56) References Cited

U.S. PATENT DOCUMENTS

| | | |
|---|---|---|
| 3,760,415 | 9/1973 | Holmstrom . |
| 5,118,134 | 6/1992 | Mattes et al. . |
| 5,366,241 * | 11/1994 | Kithil ................................. 280/735 |
| 5,411,289 * | 5/1995 | Smith et al. ........................ 280/735 |
| 5,482,314 * | 1/1996 | Corrado et al. .................... 280/735 |
| 5,785,347 | 7/1998 | Adolph et al. . |
| 5,848,802 | 12/1998 | Breed et al. . |
| 5,871,232 * | 2/1999 | White ................................. 280/735 |
| 5,927,752 | 7/1999 | Bradin . |
| 5,943,295 | 8/1999 | Varga et al. . |

* cited by examiner

Primary Examiner—Kenneth R. Rice
(74) Attorney, Agent, or Firm—David B. Kelley

(57) ABSTRACT

A system (10) and method (100) for detecting (104) a vehicle occupant (12) in order to determine (108) a deployment force of a vehicle's air bag system. The system (10) of the present invention has a microwave emitter (20) that emits (102) low power microwaves in short duty cycle pulses at a target (14) having a reflective surface (24) therein. A detector (20) is used to detect (104) microwaves that are reflected from the target (14). Should a human occupant (12) be present in the vehicle, the microwaves will be absorbed by the occupant and according to the method (100) of the present invention, the position, size and weight of the occupant can be determined based on calibrating (106) the detected microwaves. The calibrated data is used to calculate (106) a deployment force for the air bag (17).

12 Claims, 1 Drawing Sheet

DETECTING AUTOMOBILE SEAT OCCUPANT BY MICROWAVE ABSORPTION

TECHNICAL FIELD

The present invention relates generally to an occupant sensing and crash behavior system for a motor vehicle, and more particularly to detecting an occupant by microwave absorption.

BACKGROUND OF THE INVENTION

Motor vehicles are equipped with air bag systems that are electrically activated in the event of a vehicle crash. The activation of the air bag systems is generally accomplished by way of impact sensors strategically positioned in various places about the vehicle.

It is known that an adaptive restraint system can be accomplished by using weight sensors to determine the weight characteristic of the seat's occupant. By determining the relative weight of the occupant, the force of deployment for the air bag can be determined. However, it is possible that the seat's occupant may be quite heavy and still be small in size, which requires different deployment forces than a larger, lighter occupant. Likewise, it is important to distinguish between a human occupant and an inanimate object in determining air bag deployment.

Sensors to detect the mere presence of a seat occupant are also known. For example, capacitive sensors have been used to detect the presence of a human occupant in the seat in order to determine air bag deployment forces. However, capacitive sensors merely detect the presence of a human occupant and cannot distinguish between a small occupant and a large occupant, nor can the capacitive sensor distinguish between a heavy occupant and a light occupant.

SUMMARY OF THE INVENTION

It is an object of the present invention to sense the presence of a seat occupant. It is another object of the present invention to sense the position of the seat occupant. It is a further object of the present invention to determine the size and weight of a seat occupant. It is still a further object of the present invention to determine the deployment force necessary to properly restrain the seat occupant based on the presence, position, size and weight of the seat occupant. It is yet a further object of the present invention to determine the deployment force necessary based on information received from a microwave emitter/detector system mounted in the vehicle.

In carrying out the above objects and other objects and features of the present invention there is provided a method and system for detecting an occupant in an automobile seat by microwave absorption. According to the present invention, a low power microwave emitter is positioned in the vehicle to illuminate the seat in a predefined pattern. A reflective surface inside the structure of the seat reflects energy back to a detector.

An occupant will leave part of the reflector exposed. The portion of exposed reflector is dependent to the size of the occupant. Energy not reflected is absorbed proportional to the size of the occupant. The intensity of the reflected signal can be calibrated to determine the presence, position, size and weight of the seat occupant. The calibrated signal is then used to determine the force of the air bag deployment.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
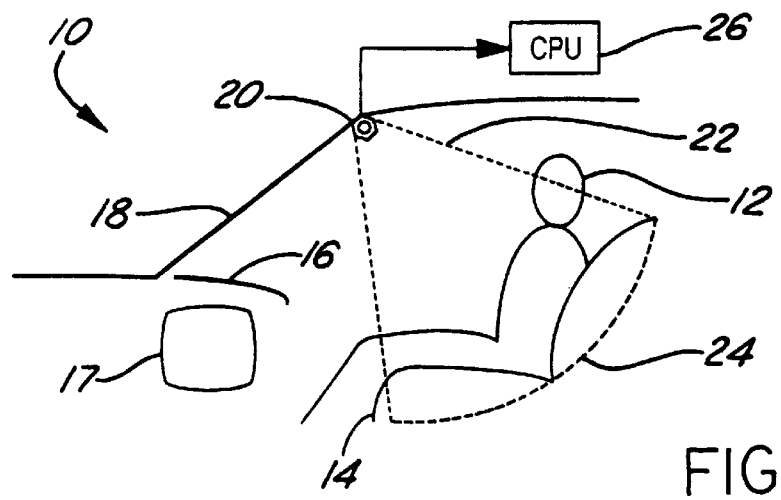
FIG. 1 is a diagram of the system and method of the present invention as it is applied to a vehicle seat having a human occupant.

Referring now to FIG. 1 there is shown a diagram representing a section of the passenger compartment 10 of a vehicle. A human occupant 12 sits on a seat 14. A portion of the vehicle's instrument panel 16 is shown in front of the seat 14, which typically houses an air bag 17. Also shown, is a portion of the vehicle's windshield 18.

According to the system of the present invention, a low power microwave emitter/detector 20 is positioned in the vehicle so that it illuminates the seat 14 in a predefined pattern 22. The seat 14 is a target for the emitted microwaves because the seat 14 is the space in the vehicle that is normally occupied by a passenger.

The emitter/detector 20 is shown to be mounted above the windshield, but it may be located elsewhere, i.e. the instrument panel, and accomplish a similar predefined pattern. It should also be noted that while the predefined pattern 22 shown in the present example is a cone shaped pattern, it is possible to accomplish similar results with other patterns that one skilled in the art is capable of substituting for the cone shaped pattern 22.

A reflective surface 24 is located inside the seat 14 and is used to reflect energy back to the emitter/detector 20. It is possible, that for packaging convenience, the reflector may be segmented and inserted in the seat in a predetermined pattern. The predetermined pattern being such that the microwaves are reflected back to the emitter/detector as desired. It is also possible that the size and shape of the reflector are designed to easily recognize and distinguish a human occupant, i.e. a body having identifiable limbs, etc., from an inanimate object.

If the seat is unoccupied, all of the emitted energy is reflected back to the emitter/detector 20. A small occupant will leave part of the reflector 24 exposed, and the energy that is not absorbed by the occupant, reaches the reflector 24 will be reflected back to the emitter/detector. The energy blocked from the detector by the occupant 12 is absorbed proportional to the bulk of the occupant 12. Therefore, the intensity of the energy reflected back to the emitter/detector 20 can be calibrated to reflect the position, presence, size, and weight of the occupant 12.

An occupant 12 who is leaning forward, or sideways, will also be detected based on the reflected energy received at the emitter/detector 20. Since more of the reflector is exposed when the occupant 12 shifts in the seat, it is possible to determine the position of the occupant 12 based on the amount of reflected energy.

The reflected energy detected at the emitter/detector 20 is used in known algorithms and methods to calculate the size and weight of the seat occupant and is further manipulated to determine a deployment force for the air bag system, as by a CPU 26 or other known method. There are many alternatives to calculating the deployment force and one skilled in the art is capable of using the information provided by the system and method of the present invention to determine this calculation. Therefore, the many alternatives will not be discussed herein.

It is known that electrical conductors reflect microwaves. It is also known that non-polar insulators are transparent to microwaves. The concept of microwave ovens is based on the broadband absorption of microwaves by polar molecules such as water. Muscle tissue is about 75% water and absorbs microwaves 12–17 times more than fat tissue or bone.

Muscle tissue absorbs microwaves hundreds of times better than inanimate objects such as books, briefcases, plastics, etc. The optimal frequency of the microwave for the detection of the bulk of a human body is on the order of 100 MHz and is based on considerations of geometric resonance and penetration depth. As a comparison, the 434 MHz band is used for medical diathermy and 2.45 GHz is customarily used for microwave cooking.

According to the present invention, low power, i.e. milliwatt or some fraction thereof, is used in short duty cycle pulses and at such frequencies and power that are obtainable with inexpensive UHF transistors.

The present invention is capable of using a microwave emitter/detector to determine several variables relating to the characteristic of a seat occupant that the prior art requires separate sensors to determine. Using microwave absorption to measure the position, size and bulk of a human occupant according to the present invention is a much more accurate measurement. Therefore, the necessary deployment forces calculated as a result of the present invention are much more accurate.

Figure 2:
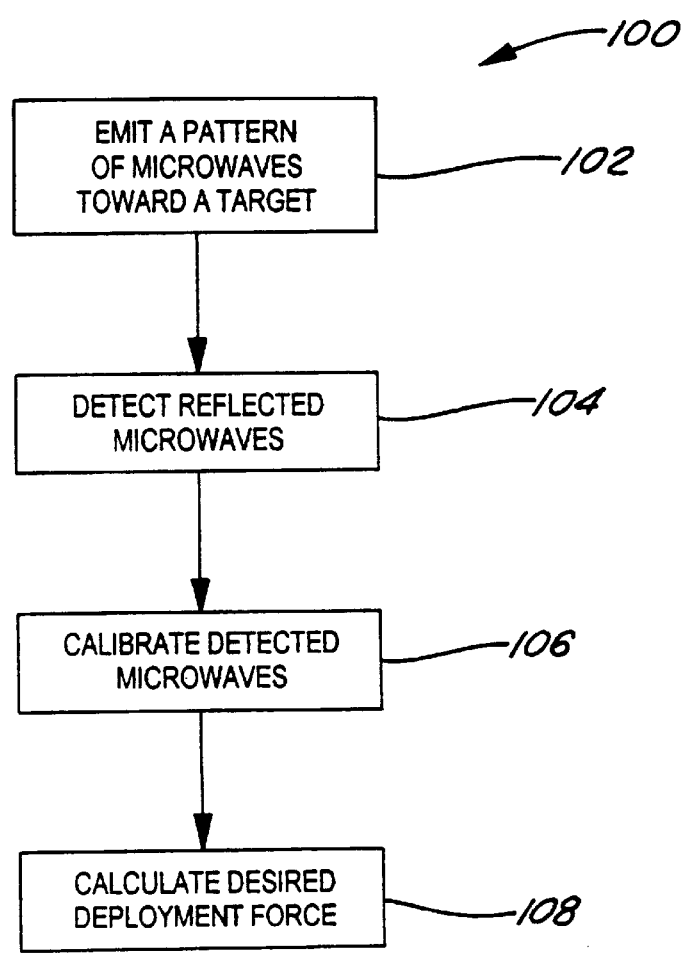
FIG. 2 is a flow chart of the method of the present invention.

FIG. 2 is a flow chart depicting the method 100 of the present invention. The microwave emitter/detector emits 102 low power microwaves in short duty cycle pulses towards a target in a predefined pattern. The emitter/detector detects 104 microwave energy that is reflected back by the target. The reflected energy is calibrated 106 to determine the presence, position, size and weight of the occupant. The system of the present invention is capable of distinguishing a human occupant from an inanimate object because a human occupant will absorb more microwave energy than an inanimate object. The calibrated data is used to calculate 106 a force to deploy an air bag. The calculated force is based on the presence, position, size and weight information received from the calibrated energy.

The invention covers all alternatives, modifications, and equivalents, as may be included within the spirit and scope of the appended claims.

What is claimed is:

1. A motor vehicle occupant detection system comprising:
   a microwave emitter positioned in the motor vehicle for emitting microwaves that produce a predefined pattern aimed at a target;
   a reflective surface located at said target; and
   a detector positioned in the motor vehicle for detecting emitted microwaves that are reflected by said reflective surface.

2. The detection system as claimed in claim 1 wherein said emitter and detector are positioned together in the motor vehicle.

3. The detection system as claimed in claim 1 wherein said reflective surface is positioned inside said target.

4. The detection system as claimed in claim 3 wherein said reflective surface is divided into segments and arranged in a predefined pattern.

5. The detection system as claimed in claim 4 wherein said segmented reflective surface has a predefined pattern representative of a human body.

6. The detection system as claimed in claim 1 wherein said emitted microwaves have low power levels.

7. The detection system as claimed in claim 6 wherein said low power microwaves are emitted in short duly cycle pulses.

8. The detection system as claimed in claim 1 further comprising means for calibrating said detected microwaves to determine a position, physical size and weight of said motor vehicle occupant.

9. The detection system as claimed in claim 8 further comprising means for calculating a force of deployment for an air bag system based on said position, size and weight of the motor vehicle occupant.

10. A method for determining air bag deployment force in a motor vehicle having a motor vehicle occupant detection system comprising a microwave emitter positioned in the motor vehicle for emitting microwaves that produce a predefined pattern aimed at a target, a reflective surface located at said target, and a detector positioned in the motor vehicle for detecting emitted microwaves that are reflected by said reflective surface; said method comprising the steps of:
    emitting microwaves at the target;
    detecting microwaves reflected from the target;
    calibrating microwaves reflected by the reflective surface and detected a the detector to reflect the presence, position, size and weight of the motor vehicle occupant;
    calculating a force necessary to deploy an air bag based on said presence, position, size, and weight of the motor vehicle occupant.

11. The method as claimed in claim 10 wherein said step of emitting microwaves further comprises emitting microwaves having low power levels.

12. The method as claimed in claim 11 wherein said step of emitting low power microwaves further comprises emitting low power microwaves in short duty cycle pulses.

* * * * *